US 11,888,718 B2

United States Patent
Tian et al.

(10) Patent No.: US 11,888,718 B2
(45) Date of Patent: Jan. 30, 2024

(54) DETECTING BEHAVIORAL CHANGE OF IOT DEVICES USING NOVELTY DETECTION BASED BEHAVIOR TRAFFIC MODELING

(71) Applicant: Palo Alto Networks, Inc., Santa Clara, CA (US)

(72) Inventors: Ke Tian, San Jose, CA (US); Yilin Zhao, San Jose, CA (US); Xiaoyi Duan, Santa Clara, CA (US); Jun Du, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/649,223

(22) Filed: Jan. 28, 2022

(65) Prior Publication Data

US 2023/0246935 A1   Aug. 3, 2023

(51) Int. Cl.
*G06N 20/00* (2019.01)
*H04L 9/40* (2022.01)
*H04L 43/0876* (2022.01)

(52) U.S. Cl.
CPC ............... *H04L 43/0876* (2013.01)

(58) Field of Classification Search
CPC .................................................. H04L 43/0876
See application file for complete search history.

(56) References Cited

U.S. PATENT DOCUMENTS

| 9,729,571 B1 * | 8/2017 | Ferguson | H04L 63/1408 |
| 2009/0024555 A1 * | 1/2009 | Rieck | G16B 40/30 |
| | | | 706/54 |
| 2015/0156213 A1 * | 6/2015 | Baker | H04L 63/1416 |
| | | | 726/23 |
| 2016/0217088 A1 * | 7/2016 | Veil | G06F 13/4068 |
| 2018/0046926 A1 * | 2/2018 | Achin | G06N 20/20 |
| 2018/0316707 A1 * | 11/2018 | Dodson | H04L 43/16 |

(Continued)

FOREIGN PATENT DOCUMENTS

WO    2020255137 A1    12/2020

OTHER PUBLICATIONS

Ahmed, "A survey of network anomaly detection techniques", Journal of Network and Computer Applications 60, 2016, pp. 19-31.

(Continued)

*Primary Examiner* — Christopher B Robinson
(74) *Attorney, Agent, or Firm* — Gilliam IP PLLC (57) ABSTRACT

An anomalous behavior detector has been designed to detect novel behavioral changes of devices based on network traffic data that likely correlate to anomalous behaviors. The anomalous behavior detector uses the local outlier factor (LOF) algorithm with novelty detection. After initial semi-supervised training with a single class training dataset representing stable device behaviors, the obtained model continues learning frontiers that delimit subspaces of inlier observations with live network traffic data. Instead of traffic variables being used as features, the features that form feature vectors are similarities of network traffic variable values across time intervals. A feature vector for the anomalous behavior detector represents stability or similarity of network traffic variables that have been chosen as device identifiers and behavioral indicators.

20 Claims, 4 Drawing Sheets

(56) References Cited

U.S. PATENT DOCUMENTS

| | | | | |
|---|---|---|---|---|
| 2019/0124045 A1* | 4/2019 | Zong | .................. | G06N 7/01 |
| 2019/0188212 A1* | 6/2019 | Miller | .................. | H04L 63/145 |
| 2019/0379589 A1* | 12/2019 | Ryan | .................. | G06F 17/142 |
| 2020/0258004 A1* | 8/2020 | Heimann | .................. | H04L 63/1433 |
| 2021/0357815 A1* | 11/2021 | Anderson | .................. | H04L 63/1425 |
| 2022/0026580 A1 | 1/2022 | Crouch et al. | | |

OTHER PUBLICATIONS

Breunig, "LOF: Identifying Density-Based Local Outliers", Proceedings of the 2000 ACM SIGMOD International Conference on Management of Data, Dallas, TX, 2000, 12 pages.

EP Application No. 22209638.0, Extended European Search Report dated Jun. 15, 2023, 9 pages.

Tomlinson, et al., "Using internal context to detect automotive controller area network attacks", Computers & Electrical Engineering, Pergamon Press, GB, vol. 91, Mar. 9, 2021, XP086540473, ISSN: 0045-7906, DOI: 10.1016/J.CON~ELECENG.2021.107048, [retrieved on Mar. 9, 2021].

* cited by examiner

DETECTING BEHAVIORAL CHANGE OF IOT DEVICES USING NOVELTY DETECTION BASED BEHAVIOR TRAFFIC MODELING

BACKGROUND

The disclosure generally relates to machine learning (e.g., CPC G06N/20) and network monitoring for security (e.g., CPC H04L 9/00).

Anomaly detection analyzes data to detect anomalous or abnormal behavior. Network behavior analysis is one aspect of network security used for intrusion detection and threat detection. Network behavior analysis examines network traffic to detect anomalous behavior based on packet inspection or based on packet signatures. A commonly accepted definition of an anomaly is an observation or datapoint that deviates from other observations to an extent that arouses suspicion that the observation was generated by a different mechanism.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to a firewall in illustrative examples. Embodiments are not limited to the disclosed anomaly detector being implemented in a firewall. The disclosed anomaly detector can be implemented distinct from a firewall. As examples, the anomaly detector can be implemented as a standalone product on a device with network traffic visibility and in communication with a packet analyzer. In other instances, well-known instruction instances, protocols, structures and techniques have not been shown in detail in order not to obfuscate the description.

Overview

Detecting anomalous behavior in network traffic that includes traffic of Internet-of-Things (IoT) devices presents multiple challenges. The behaviors of these devices (e.g., application usage) may change because of firmware updates, ownership changes, cyberattacks, etc. An anomalous behavior detector has been designed to detect novel behavioral changes of devices based on network traffic data that likely correlate to anomalous behaviors. The anomalous behavior detector uses the local outlier factor (LOF) algorithm with novelty detection. After initial semi-supervised training with a single class training dataset representing stable device behaviors, the obtained model continues learning frontiers that delimit subspaces of inlier observations with live network traffic data. Instead of traffic variables being used as features, the features that form feature vectors are similarities of network traffic variable values across time intervals. A feature vector for the anomalous behavior detector represents stability or similarity of network traffic variables that have been chosen as device identifiers and behavioral indicators.

The term "feature" is used to refer to a variable input into a learner or machine learning algorithm for training and subsequently input into a resulting model. A set of features (feature set) are the group of features that are the basis of a n-dimensional feature vector.

The term "feature value" refers to a value of a feature. For the disclosed anomaly detector, a feature value is a value indicating similarity or stability of a variable extracted from network traffic data across different time intervals.

The term "observation" as used herein refers to feature values of a feature set and to variable values used to determine the feature values. An observation may be referred to as a datapoint or sample.

Example Illustrations

Figure 1:
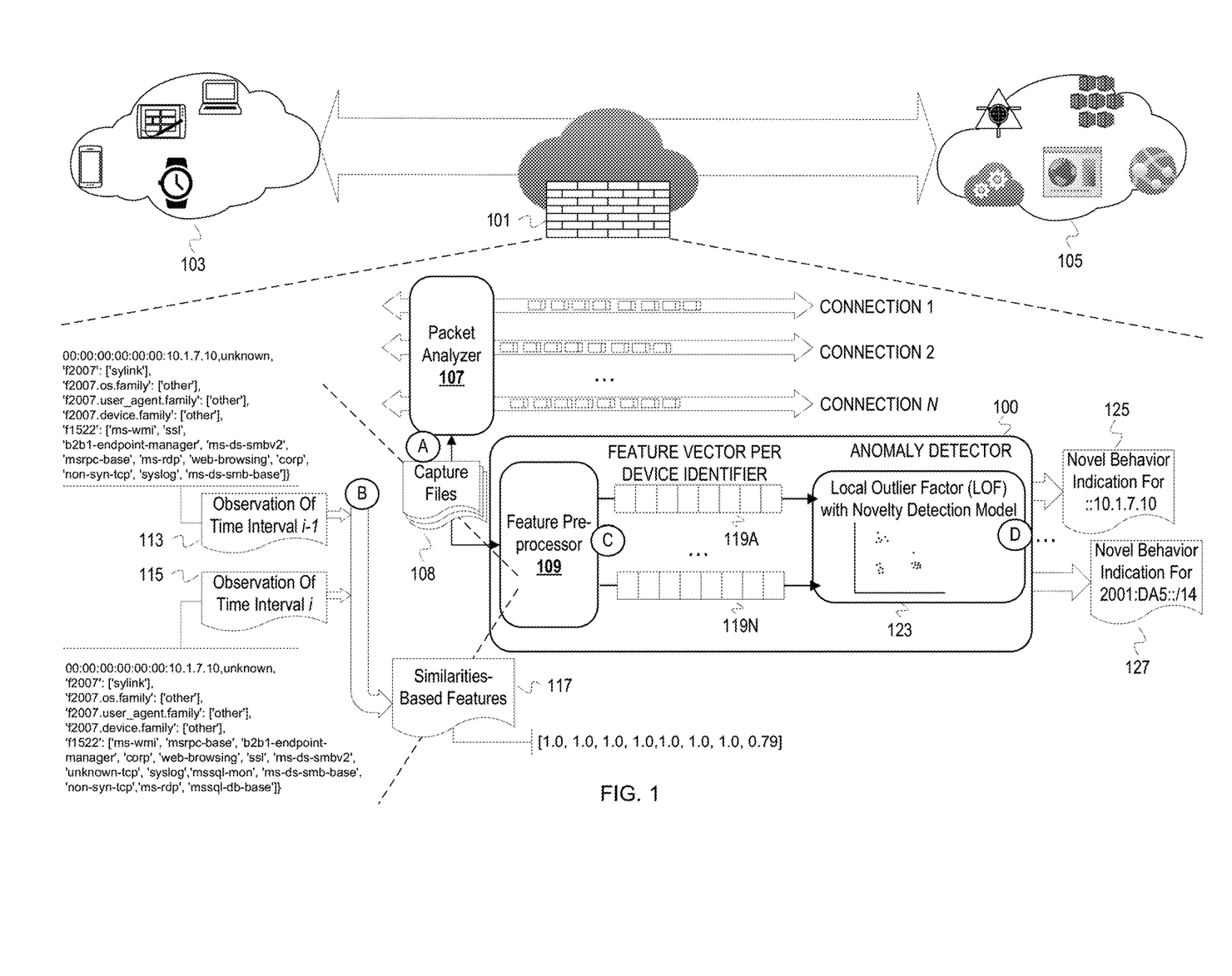
FIG. 1 is a conceptual diagram of a local outlier factor (LOF) with novelty detection based anomalous behavior detector indicating novel behavioral changes as anomalous behaviors.

FIG. 1 is a conceptual diagram of a LOF with novelty detection based anomalous behavior detector indicating novel behavioral changes as anomalous behaviors. FIG. 1 illustrates a set of diverse devices 103 communicatively connected with a set of diverse targets 105 including services and websites. The set of devices 103 may have embedded sensors, software, etc. for various tasks (e.g., a smartwatch, a heart monitor, laptop, tablet, smartphone). The set of devices 103 communicate with the set of targets 105 via a firewall 101. The firewall 101 monitors network traffic generated from the communications among the devices 103 and targets 105 over multiple connections. A packet analyzer 107 generates capture files 108 based on the network traffic visible to the firewall 101. An anomaly detector 100 analyzes the network traffic as represented by data in the capture files 108 to detect anomalous device behavior that likely correlates to a cyberattack or security vulnerability.

The anomaly detector 100 includes a feature pre-processor 109 and a local outlier factor (LOF) with novelty detection model 123. The feature pre-processor 109 extracts from the capture files 108 values of variables that have been specified, for example in a listing of variables, and that identify a device and that represent device behavior. As examples, an Internet Protocol (IP) address and a host name may be used together as a device identifier or device signature. Various message header fields that may be specified as representing device behavior include the user agent field, components of a resource string (e.g., uniform resource locator), etc. The feature pre-processor 109 processes the extracted values across time intervals to generate feature vectors to input into the LOF with novelty detection model 123. The LOF with novelty detection model 123 has been trained according to semi-supervised learning with a dataset of network traffic constrained to devices with stable behavior ("single class training dataset"). With this training dataset, a LOF with novelty detection learner was trained to learn a frontier(s) of a subspace(s) of a close distribution of observations to obtain the LOF with novelty detection model 123.

FIG. 1 is annotated with a series of letters A-D, each of which represents one or more operations. Although these stages are ordered for this example, the stages illustrate one example to aid in understanding this disclosure and should not be used to limit the claims. Subject matter falling within the scope of the claims can vary with respect to the order and some of the operations.

At stage A, the feature pre-processor 109 obtains the capture files 108 generated by the packet analyzer 107. The feature pre-processor 109 may communicate to the packet analyzer 107 a request for the capture files 108 or read the capture files 108 from a defined memory area to which the packet analyzer 107 stores capture files. The feature pre-processor 109 obtains the capture files based on detection of an evaluation trigger. The evaluation trigger may be expiration of a periodic time interval, an on-demand request, or some other condition that is associated with evaluating network traffic to protect against a cyberattack or security vulnerability. The capture files 108 span a defined time interval for comparing values, for example a 24 hour time interval.

At stage B, the feature pre-processor 109 determines measures of similarities of variables in observations 113, 115 across different time intervals for a common device identifier. In FIG. 1, the observations 113. 115 are for a device 00:00:00:00:00:00:10.1.7.10. The observation 115 is the collection of values extracted from the capture files 108 of time interval i. The observation 113 is the collection of values extracted from capture files of a previous time interval i−1. With the measures of similarities or similarity coefficients/indices, the feature pre-processor 109 obtains a feature set of variable similarities across time intervals—similarities based features 117.

At stage C, the feature pre-processor 109 generates feature vectors 119A-119N. The feature pre-processor 109 generates the feature vector 119A from the similarities-based features 117. The feature pre-processor 109 generates a feature vector for each feature set of variable similarities determined per device identifier indicated in the capture files 108 with a corresponding observation in a preceding time interval.

At stage D, the feature pre-processor 109 inputs each of the feature vectors 119A-119N into the LOF with novelty detection model 123 to obtain an indication of whether the corresponding set of feature set similarities is an inlier or outlier (i.e., novel). If determined to be an outlier by the LOF with novelty detection model 123, then the anomaly detector 100 generates an anomaly indication or novel behavior indication associated with the corresponding device identifier. As illustrated, the anomaly detector 100 generates an indication 125 for device identifier ::10.1.7.10 and an indication 127 for a device identifier 2001:DA5::/14. The indications of novel behavior/anomalous behavior may then trigger further investigation into the activity of the corresponding device.

Figure 2:
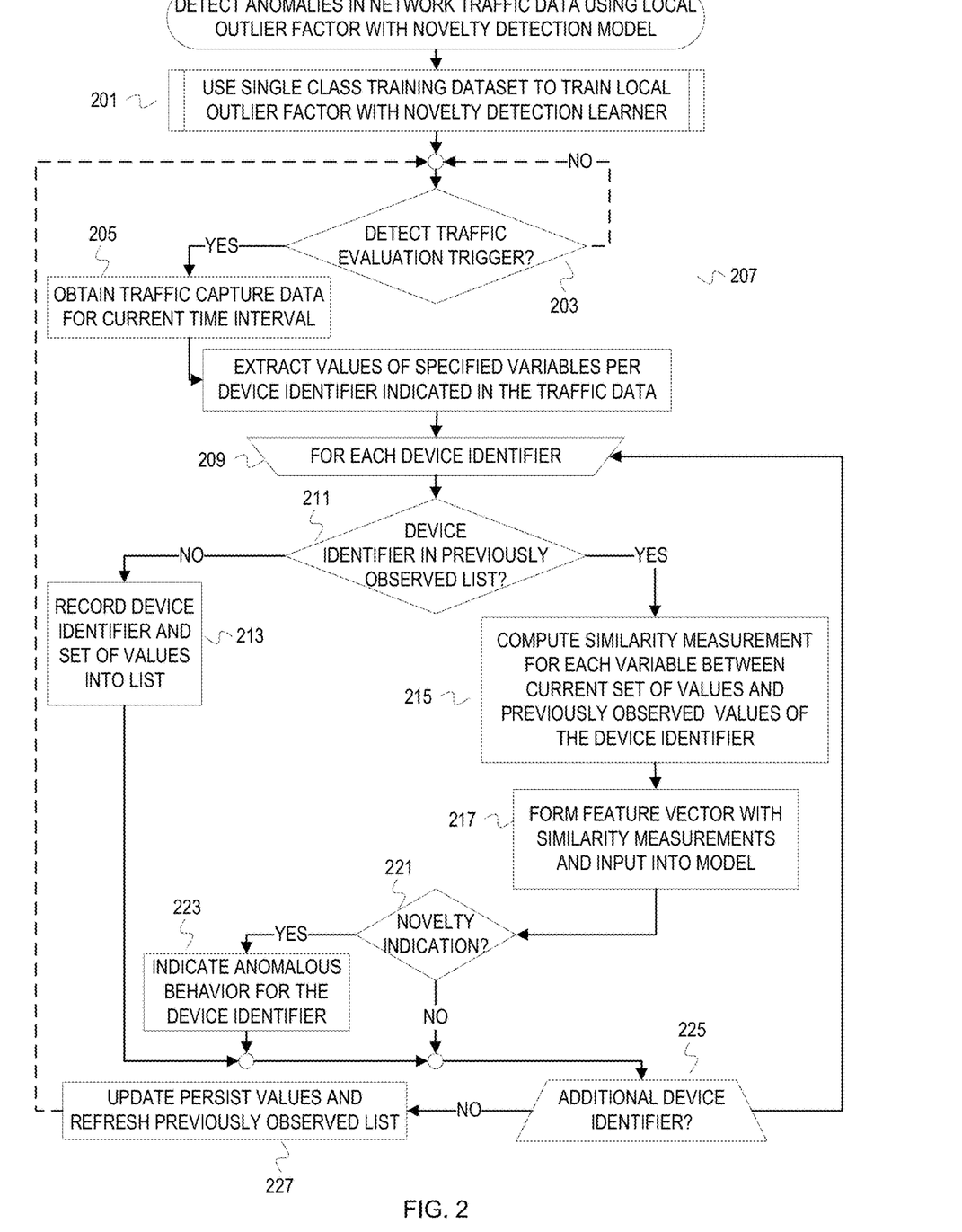
FIG. 2 is a flowchart of example operations for detecting anomalies in network traffic data using a LOF with novelty detection model.

FIG. 2 is a flowchart of example operations for detecting anomalies in network traffic data using a LOF with novelty detection model. FIG. 2 refers to an anomaly detector as performing the operations for consistency with FIG. 1.

At block 201, the anomaly detector uses a single class training dataset to train a LOF with novelty detection learner. After deployment, the resulting LOF with novelty detection model with continue to learn frontiers of close distribution subspaces. Example operations for block 201 will be described with FIG. 3 after the description with FIG. 2.

At block 203, the anomaly detector determines whether a traffic evaluation trigger has been detected. For instance, the anomaly detector determines whether s seconds have passed since the previous traffic evaluation or whether a specified evaluation time has arrived (e.g., 1:00 AM). The evaluation trigger can be a setting of the anomaly detector or another software that operates in coordination with the anomaly detector. In addition, the anomaly detector can be programmed to respond to requests for a traffic evaluation (e.g., an alarm, manual request, or interrupt based request). If the evaluation trigger is not detected, then operational flow asynchronously returns to block 203. This may be a waiting period. Otherwise, operational flow proceeds to block 205.

At block 205, the anomaly detector obtains traffic capture data for a current time interval. To illustrate, the anomaly detector may evaluate network traffic at 1:00 AM every day. Upon completion of the time interval, the anomaly detector obtains the traffic capture data for the 24 hour time interval ending at 1:00 AM that day. The anomaly detector can read traffic capture data from files recorded or created by a packet snooper or analyzer with the time interval indicated in the request or query parameters.

At block 207, the anomaly detector extracts values of specified variables per device identifier indicated in the traffic data. The variables (e.g., network address, message header fields, message body fields, etc.) are defined in a configurable list set in the anomaly detector or indicated in a file read by the anomaly detector. The configurable list can also specify variables to combine or aggregate. Assuming packet capture files, the anomaly detector parses each record and aggregates the values for the specified variables and/or variable set per device identifier, whether that is network address alone or network address and another variable, for example host name. To illustrate, the anomaly detector can indicate a device identifier when first encountered while parsing the packet capture data and aggregate values of specified variable in subsequent records with the same device identifier. The specified variables are not referred to as features because the variables are not the basis of feature vectors. The similarity indices of the variables across/between time intervals are the features.

At block 209, the anomaly detector, for each device identifier indicated in the captured traffic data, analyzes the extracted values to determine whether it is associated with anomalous behavior with the LOF with novelty detection model. The anomaly detector will maintain a history of previously extracted values (i.e., observations) by device identifiers for at least one previous time interval. This will be referred to as the "previously observed list."

At block 211, the anomaly detector determines whether the device identifier is in the previously observed list. The anomaly detector can search by device signature (i.e., multiple static variables selected as a device signature) or by network address depending upon what has been designated as a device identifier. If the device identifier is in the previously observed list, then operational flow continues to block 215. Otherwise, operational flow continues to block 213.

At block 215, the anomaly detector computes a similarity measurement for each variable between the current time interval set of values and the previous time interval set of values. The anomaly detector can use different techniques to compute the similarity measurement. Example techniques for computing similarity measurement include computing a Jaccard index, computing a Jaccard distance, computing a coefficient of community or Sœorensen coefficient, and computing a Euclidean distance. While some variables will have a single value in each time interval (e.g., network address), other variables can have multiple values from different messages within each time interval. When extracting the values, the anomaly detector creates a set (e.g., array or list) of these multiple values per variable. Thus, the similarity measurements will sometimes be between single element/member sets and sometimes be between multiple element sets. Moreover, embodiments may aggregate values of different variables and generate a feature based on similarity of the sets of values of aggregated variables.

At block 217, the anomaly detector the anomaly detector forms a feature vector with the computed similarity measurements and inputs the feature vector into the LOF with novelty detection model. As noted already, a feature may be a similarity measurement of a variable with a single value per time interval, a similarity measurement of a variable with a multiple values per time interval, or a similarity measurement of multiple variables each with one or more values per time interval.

At block 221, the anomaly detector determines whether the model indicates the feature vector as being an inlier or outlier. If the model indicates the feature vector as an outlier, then operational flow continues to block 223. Otherwise, operational flow continues to block 225.

At block 223, the anomaly detector indicates anomalous behavior detection for the device identifier associated with the feature vector indicated as an outlier/novelty by the LOF with novelty detection model. The anomaly detector may generate a notification or update a user interface, as examples.

At block 225, the anomaly detector determines whether there is an additional device identifier with extracted values to analyze. If so, then operational flow returns to block 209. If not, then operational flow proceeds to block 227.

If it is determined that a device identifier was not in the previously observed list (211), then the anomaly detector records the device identifier and the set of extracted values into the previously observed list and sets. The anomaly detector records the device identifier for comparison at a next time interval. Operational flow proceeds from block 213 to block 225.

At block 227, the anomaly detector updates the persist values and refreshes the previously observed list. The anomaly detector uses the persist value to allow comparison of values across non-sequential time intervals. This allows the anomaly detector to detect anomalous behavior of a device that may be inactive for a time interval to avoid detection. A persist threshold is also set as an indicator to remove a device identifier from the previously observed list. The persist value and the persist threshold are configurable values set according to domain knowledge, resource availability, and/or preference for persisting a device identifier's information for analysis to detect anomalous behavior. Updating the persist value can be an increment operation. Refreshing the list involves comparing the persist values against the persist threshold. Those that have aged out of consideration (i.e., satisfy the persist threshold) are removed from the list. Operational flow returns to block 203.

Figure 3:
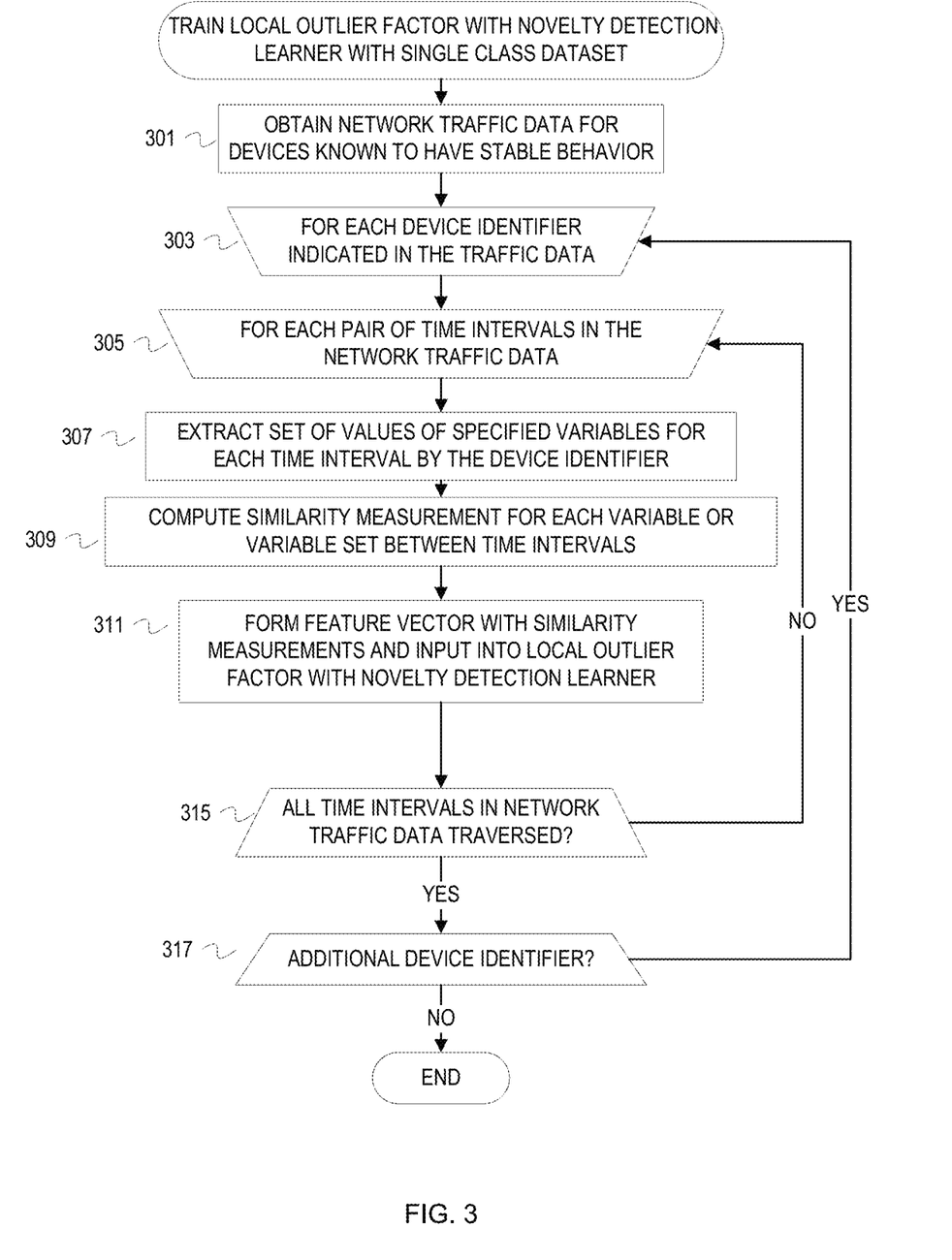
FIG. 3 is a flowchart of example operations for training the LOF with novelty detection learner with a single class dataset representing stable device behavior.

FIG. 3 is a flowchart of example operations for training the LOF with novelty detection learner with a single class dataset representing stable device behavior. The operations of FIG. 3 refer to the anomaly detector assuming the anomaly detector will invoke the program code implementing the LOF with novelty detection algorithm.

At block 301, the anomaly detector obtains network traffic data for devices known to have stable behavior. A dataset of network traffic or capture files from network traffic of devices configured/programmed as layer 2 devices can be used. The communications among these devices involving protocol data units limited to hardware layers are expected to have stable values across time intervals. This training dataset will span multiple time intervals, although the time intervals used for the training dataset are not necessarily the same when evaluating network traffic with the deployed model. Since the behavior of the layer 2 devices are stable, the time intervals can be much smaller (e.g., hour granularity).

At block 303, the anomaly detector processes the network traffic data to create feature vectors to train the LOF with novelty detection learner. The anomaly detector creates a feature vector per device identifier.

At block 305, the anomaly detector processes the network traffic data per device identifier by time interval pairs. Training of the learner can use successive pairs of time intervals, but successive time intervals are not necessary. The anomaly detector can compare values among different times of data (e.g., each hour within a morning range), between different times of day (e.g., compare values of time intervals in the morning range against time intervals in an evening range).

At block 307, the anomaly detector extracts a set of values for each time interval by the device identifier. To illustrate, the anomaly detector can parse traffic logs of a first time interval to extract values for specified variables and repeat the extraction for a second time interval reflected in the logs.

At block 309, the anomaly detector computes a similarity measurement for each variable or variable set between the time interval based value sets. This is the same similarity measurement technique as discussed with reference to block 215.

At block 311, the anomaly detector forms a feature vector with the similarity measurements. The anomaly detector then inputs the feature vector into the LOF with novelty detection learner. The learner learns the frontier of a close distribution of observations of similarity measurements according to the model parameter k. This model parameter is set to acquire a k-distance related to k nearest neighbors that relates to densities used by the algorithm.

At block 315, the anomaly detector determines whether all time intervals in the traffic data have been traversed. If they have, then operational flow continues to block 317. If not, then operational flow returns to block 305.

At block 317, the anomaly detector determines whether another device identifier is indicated in the network traffic data for processing. If there is another device identifier, then operational flow returns to block 303. Otherwise, the training dataset has been processed and the training yields a LOF with novelty detection model.

The disclosure refers to an anomaly detector for consistency throughout the description. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, embodiments may not perform the operations depicted in blocks 213 and 227 of FIG. 2. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
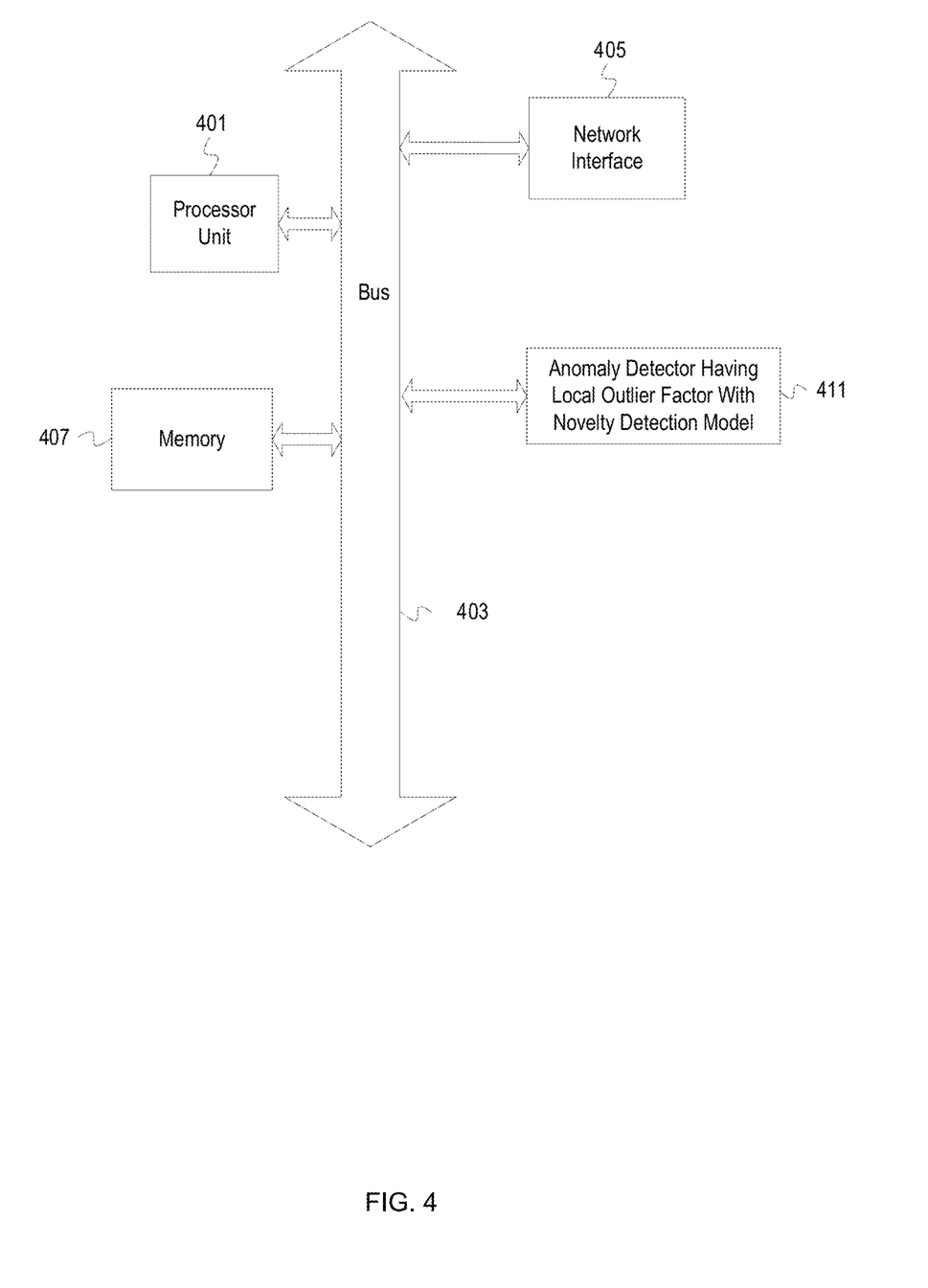
FIG. 4 depicts an example computer system with an anomaly detector having a LOF with anomaly detection model.

FIG. 4 depicts an example computer system with an anomaly detector having a LOF with anomaly detection model. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes an anomaly detector having a LOF with anomaly detection model 411. The anomaly detector having a LOF with anomaly detection model 411 detects anomalies in device behavior based on network traffic data according to whether the LOF with novelty detection model outputs an outlier indication (e.g., local outlier factor>1). The LOF with novelty detection model is trained with a single class training dataset of network traffic data of stable devices. The network traffic data is used to create feature vectors of similarity measurements of variables or variable sets indicated in network traffic data. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   training a local outlier factor with novelty detection learner with a training dataset constrained to observations of stable device behaviors, wherein the observations are extracted from network traffic and correspond to variables that have been selected as representing device behavior; and
   analyzing network traffic to determine anomalous device behavior using a model obtained from the training, wherein analyzing the network traffic comprises,
      determining similarity measurements for the variables across time intervals for each of a set of one or more device identifiers indicated in the network traffic of the time intervals;
      generating a first feature vector for a first of the device identifiers with corresponding ones of the similarity measurements; and indicating anomalous behavior corresponding to the first device identifier based, at least in part, on whether the model indicates the first feature vector as an outlier.

2. The method of claim 1, wherein the training dataset comprises observations of devices that communicate at a hardware layer of a network communications stack.

3. The method of claim 1, wherein the variables comprise one or more static variables and a plurality of dynamic variables.

4. The method of claim 3, wherein the static variables at least comprise network address and the dynamic variables comprise variables indicating at least one of an application, a service, a domain, a product, and an agent.

5. The method of claim 1, wherein determining the similarity measurements comprises, for each of the set of device identifiers, computing a similarity measurement for each variable across the time intervals corresponding to the device identifier.

6. The method of claim 5, wherein computing the similarity measurement for each variable comprises computing one of a distance and a similarity coefficient for each variable based on values of the variable across the time intervals.

7. The method of claim 1, wherein analyzing the network traffic further comprises, for each time interval, extracting values of the variables from packet capture data for the time interval and aggregating the values by device identifiers.

8. The method of claim 1 further comprising aggregating values of each variable with multiple values within a time interval into a set of values, wherein determining similarity measurements of variables across time intervals comprises determining similarity measurements between sets of values across the time intervals.

9. The method of claim 1 further comprising:
determining that a listing of variables to monitor indicates a set of variables to aggregate within a time interval; and
for each of the set of variables detected in a time interval, aggregating values of the set of variables within a time interval into a set of values, wherein determining similarity measurements of variables across time intervals comprises determining similarity measurements between the sets of values across the time intervals.

10. A non-transitory, computer-readable medium having program code stored thereon, the program code comprising instructions to:
determine similarity measurements for variables across time intervals for each of a set of one or more device identifiers indicated in network traffic of the time intervals, wherein the variables are variables previously identified as correlating to device behavior and device identity;
for each set of similarity measurements determined for each device identifier, generate a feature vector with the set of similarity measurements;
input the feature vector into a local outlier factor with novelty detection model that was trained based on network traffic constrained to devices with stable behavior; and
indicate detection of an anomaly if the local outlier factor with novelty detection indicates an outlier.

11. The non-transitory, computer-readable medium of claim 10, wherein the program code further comprises instructions to train a local outlier factor with novelty detection learner with a training dataset constrained to network traffic of devices with stable behavior.

12. The non-transitory, computer-readable medium of claim 10, wherein the instructions to determine the similarity measurements comprise instructions to compute, for each of the set of device identifiers, a similarity measurement for one or more of the variables across the time intervals corresponding to the device identifier.

13. The non-transitory, computer-readable medium of claim 12, wherein the instructions to compute the similarity measurement for one or more of the variables comprise instructions to compute one of a distance and a similarity coefficient.

14. The non-transitory, computer-readable medium of claim 10, wherein the program code further comprises instructions to extract values of the variables from packet capture data for each time interval and aggregate the values by device identifier and time interval.

15. The non-transitory, computer-readable medium of claim 10, wherein the program code further comprises instructions to aggregate values of each variable with multiple values within a time interval into a set of values, wherein the instructions to determine similarity measurements of variables across time intervals comprise instructions to determine similarity measurements between sets of values across the time intervals.

16. The non-transitory, computer-readable medium of claim 10, wherein the program code further comprises instructions to:
determine that a listing of variables to monitor indicates a set of variables to aggregate within a time interval; and
for each of the set of variables detected in a time interval, aggregate values of the set of variables within a time interval into a set of values, wherein the instructions to determine similarity measurements of variables across time intervals comprise instructions to determine similarity measurements between sets of values across the time intervals.

17. An apparatus comprising:
a processor; and
a machine-readable medium having program code stored thereon, the program code executable by the processor to cause the apparatus to,
determine similarity measurements for variables across time intervals for each of a set of one or more device identifiers indicated in network traffic of the time intervals, wherein the variables are variables previously identified as correlating to device behavior and device identity;
for each set of similarity measurements determined for each device identifier, generate a feature vector with the set of similarity measurements;
input the feature vector into a local outlier factor with novelty detection model that was trained based on network traffic constrained to devices with stable behavior; and
indicate detection of an anomaly if the local outlier factor with novelty detection indicates an outlier.

18. The apparatus of claim 17, wherein the machine-readable medium further has stored thereon program code executable by the processor to cause the apparatus to train a local outlier factor with novelty detection learner with a training dataset constrained to network traffic of devices with stable behavior.

19. The apparatus of claim 17, wherein program code to determine the similarity measurements comprises program code executable by the processor to cause the apparatus to compute, for each of the set of device identifiers, a similarity measurement for one or more of the variables across the time intervals corresponding to the device identifier.

20. The apparatus of claim 19, wherein the program code to compute the similarity measurement for one or more of the variables comprises program code executable by the processor to cause the apparatus to compute one of a distance and a similarity coefficient.

\* \* \* \* \*